UNITED STATES PATENT OFFICE.

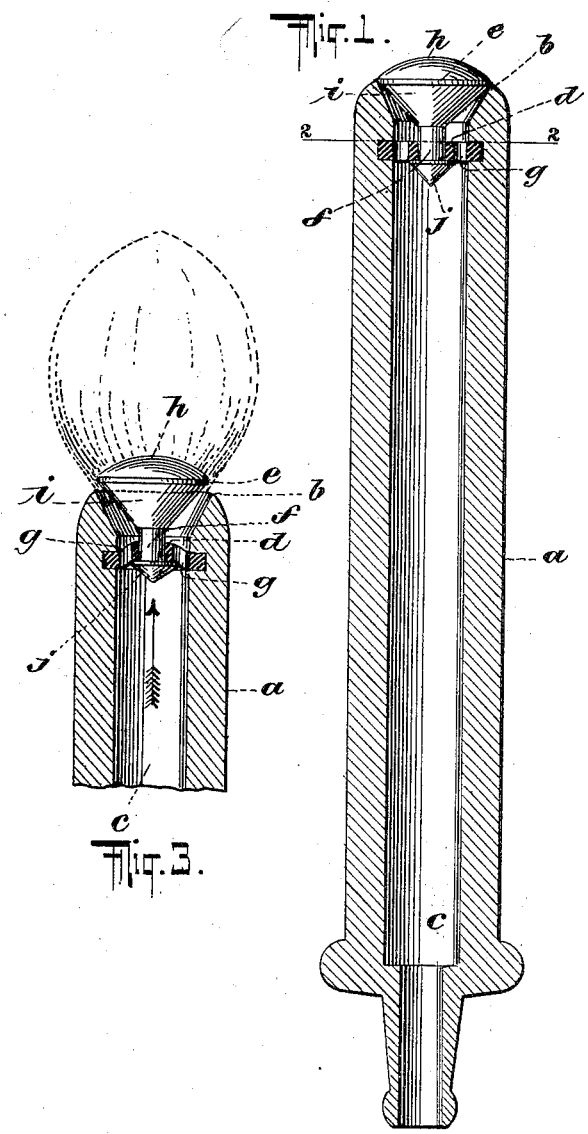

RUSSELL PARKER, OF BROOKLYN, NEW YORK, ASSIGNOR TO PARKER, STEARNS & SUTTON, OF NEW YORK, N. Y., A CORPORATION OF NEW YORK.

SYRINGE-NOZZLE.

SPECIFICATION forming part of Letters Patent No. 688,881, dated December 17, 1901.

Application filed March 15, 1901. Serial No. 51,224. (No model.)

*To all whom it may concern:*

Be it known that I, RUSSELL PARKER, a citizen of the United States, residing in the borough of Brooklyn, city of New York, county of Kings, State of New York, have invented certain new and useful Improvements in Syringe-Nozzles, of which the following is a specification.

My invention relates to vaginal irrigators; and it has for its object to produce a syringe-nozzle particularly adapted for use as a vaginal irrigator which will thoroughly and efficiently cleanse the parts, which will be sanitary in use, and which may be readily cleansed and antiseptized.

In the accompanying drawings I have shown, by way of example, a vaginal irrigator in which one form of my invention is embodied.

In the drawings, Figure 1 is a longitudinal section through the irrigator on line 1 1 of Fig. 2. Fig. 2 is a section above the elastic partition on line 2 2 of Fig. 1, and Fig. 3 is a fragmentary sectional view showing the position of the parts in use and the form assumed by the spray.

In the drawings, $a$ represents the tubular body, which may be made of any suitable material, preferably hard or soft rubber. This body terminates in a cup-shaped or conical seat $b$. Firmly seated in the bore $c$ of the body is a cross-piece, spider, or partition $d$. In the present instance I have shown it as a partition perforated centrally for the reception of the stem $f$ of a spreader or button $e$ and provided with a series of apertures $g$, surrounding the said stem. This cross-piece, partition, or diaphragm, whatever its character, is made of a highly-elastic substance, such as pure rubber, so that it may dilate or bend outwardly, as shown in Fig. 3. In the present instance I have shown the spreader $e$ as in the form of a button, round upon its external face $h$ and tapering or frusto-conical upon its inner face $i$ to snugly fit the cup or recess which constitutes the conical seat $b$. The stem $f$ is provided with a suitable head $j$, which forms a shoulder to engage behind the diaphragm $d$. The exterior surface $h$ of the spreader preferably forms a practical continuation of the outer wall of the tubular body $a$, so that the end of the irrigator will form a practically continuous surface without presenting crevices for the lodgement of foreign matter. The parts are preferably so constructed that normally—that is to say, when the diaphragm $d$ is not dilated—the spreader or button $e$ will be held firmly to its seat. When a flow of water occurs, the water-pressure will lift the spreader off its seat and permit water to emerge in a jet. The general form of this jet under normal pressure is clearly shown in Fig. 3, wherein the water-jet is shown as of a general ovoid shape. When the water-pressure is relieved, the spreader will be restored to its normal position by the natural resiliency of the diaphragm $d$. This spreader by reason of the duties required of it is preferably made heavy. Some kinds of metal will suffice for the purpose. It will be obvious that as the orifice of the irrigator when not in use is kept firmly closed there will be no chance for lodgement of foreign matter therein, and whatever foreign matter may collect at the periphery of the annular emission-orifice will be immediately washed away when water is run through, as is usually done before use.

Having described my invention, what I claim, and desire to secure by Letters Patent, is—

1. The combination of the tube, the spreader at the discharge end of the tube, and the elastic cross-piece extending transversely of the tube's bore and secured to the tube peripherally, the spreader being connected with the said cross-piece at a distance from its edge, so that the cross-piece by bending will allow the spreader to uncover the outlet of the tube.

2. The combination of the tube, the spreader at the discharge end thereof, and the elastic cross-piece the marginal portion of which is secured to the tube while its central portion, which extends across the tube's bore, is connected with the spreader and apertured adjacent thereto.

RUSSELL PARKER.

Witnesses:
GEO. E. MORSE,
CHARLES E. SMITH.